(12) United States Patent
Lamond et al.

(10) Patent No.: US 6,226,886 B1
(45) Date of Patent: May 8, 2001

(54) TAPE MEASURE

(75) Inventors: Donald R. Lamond, Lynbrook, NY (US); Bert D. Heinzelman, Tenafly, NJ (US); Dylan Akinrele, Brooklyn, NY (US); Walter Stoeckmann, Carmel, NY (US); Richard Whitehall, New York, NY (US)

(73) Assignee: General Housewares Corporation, Terre Haute, IN (US)

( * ) Notice: Subject to any disclaimer, the term of this patent is extended or adjusted under 35 U.S.C. 154(b) by 0 days.

(21) Appl. No.: 09/305,465

(22) Filed: May 6, 1999

(51) Int. Cl.$^7$ .................................................. G01B 3/10
(52) U.S. Cl. .................................................. 33/769; 33/770
(58) Field of Search ........................... 33/758, 761, 767, 33/768, 769, 770

(56) References Cited

U.S. PATENT DOCUMENTS

| | | |
|---|---|---|
| D. 275,460 | 9/1984 | Cohen . |
| D. 331,542 | 12/1992 | Jacoff . |
| D. 332,414 | 1/1993 | Bordenave . |
| D. 342,687 | 12/1993 | Kang . |
| D. 364,575 | 11/1995 | Goldner . |
| D. 373,090 | 8/1996 | Bennett . |
| 992,170 | 5/1911 | Crane ..................................... 33/758 |
| 2,036,720 | 4/1936 | Ritter ..................................... 33/768 |
| 2,663,941 | 12/1953 | Dart ....................................... 33/768 |
| 4,462,160 | 7/1984 | Cohen et al. . |
| 4,603,481 | 8/1986 | Cohen et al. . |
| 4,663,854 * | 5/1987 | Miller et al. .......................... 33/767 |
| 4,827,622 | 5/1989 | Makar .................................... 33/770 |
| 4,908,954 * | 3/1990 | Johnson ................................. 33/768 |
| 4,924,597 | 5/1990 | Tursi ..................................... 33/758 |
| 4,931,366 * | 6/1990 | Mullaney, Jr. ........................ 33/769 |
| 5,077,911 | 1/1992 | Von Wedemeyer . |
| 5,210,956 | 5/1993 | Knispel et al. . |
| 5,379,523 | 1/1995 | Wingert . |
| 5,402,583 | 4/1995 | Komura ................................. 33/758 |
| 5,575,077 | 11/1996 | Jung Tae . |
| 5,746,004 | 5/1998 | Wertheim . |
| 5,768,797 * | 6/1998 | Trevino ................................. 33/761 |
| 5,845,412 * | 12/1998 | Arcand .................................. 33/770 |
| 5,845,413 * | 12/1998 | Zayat, Jr. ............................... 33/770 |
| 6,115,931 * | 9/2000 | Arcand .................................. 33/770 |

* cited by examiner

*Primary Examiner*—G. Bradley Bennett
(74) *Attorney, Agent, or Firm*—McDermott, Will & Emery

(57) ABSTRACT

A tape measure having a housing that encloses a coiled tape rule retractably mounted therein. The housing is constructed with an outer coating of a generally soft, resilient, pliant material that extends over a substantial portion of the housing. The tape measure further provides a locking button that is slidably attached to the housing and is adapted to selectively prevent the tape rule from moving with respect to the opening in the housing. The locking button generally includes a central portion that is located adjacent to the peripheral wall and at least one side portion located adjacent to a side wall of the housing. The locking button further includes an outer surface with an outer coating thereon of a relatively soft, skid-resistant material. The tape measure further provides a tape clip attached to a terminal end of the tape rule that includes a friction member made of a generally soft, non-skid material attached to a clip portion of the tape clip. The friction member is advantageously mounted to the clip portion by molding the friction member within a pair of apertures through the clip portion.

21 Claims, 6 Drawing Sheets

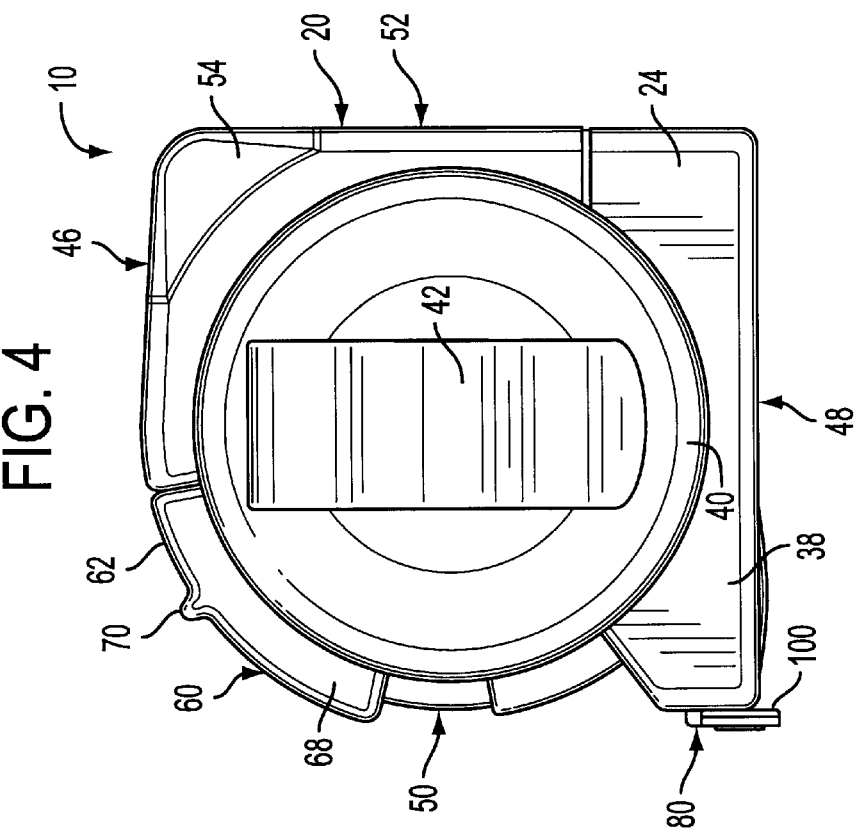
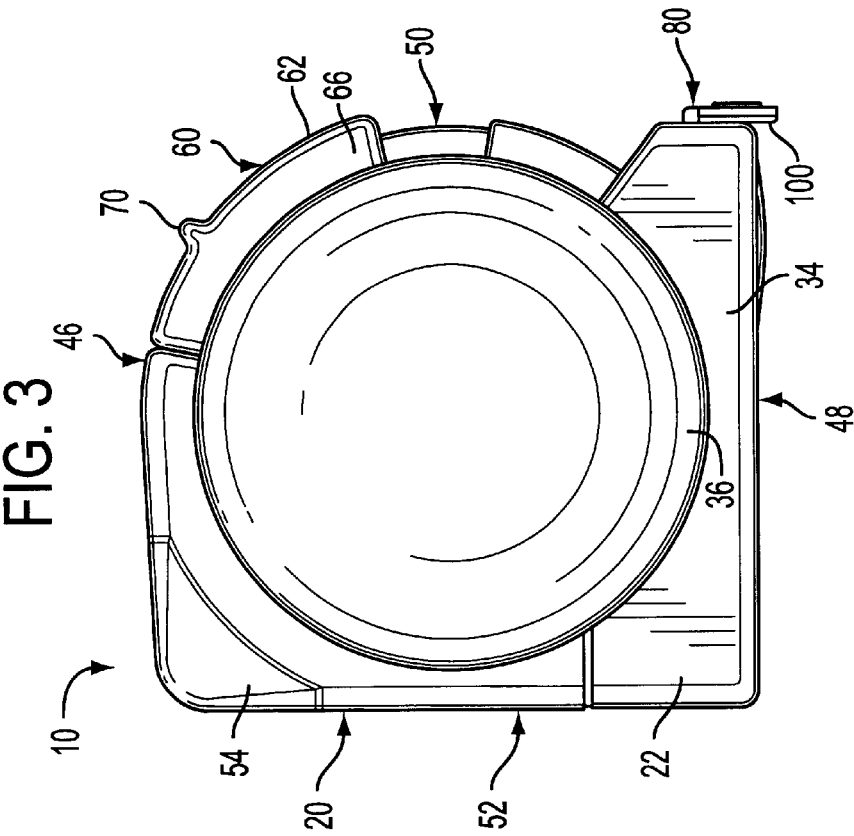

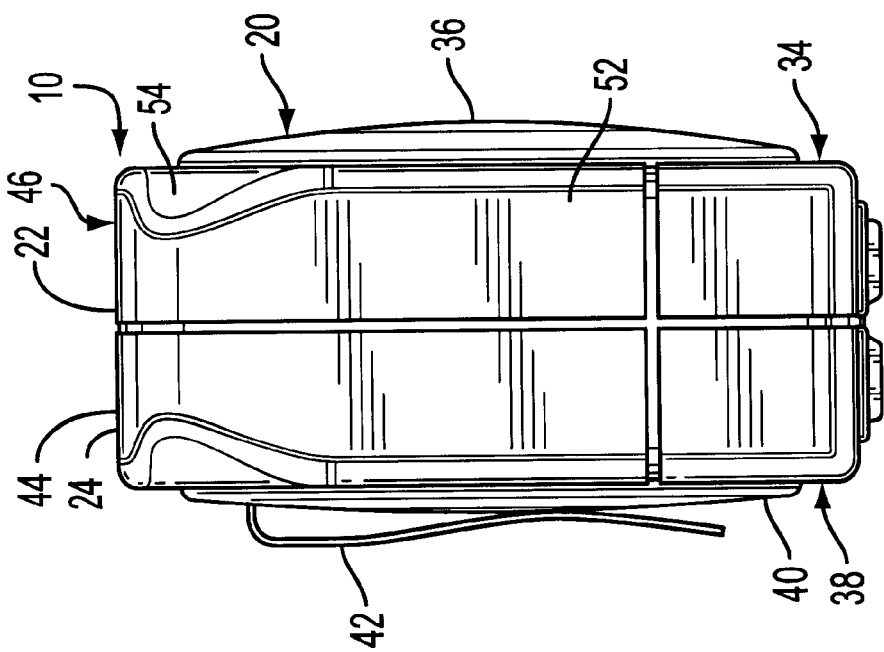
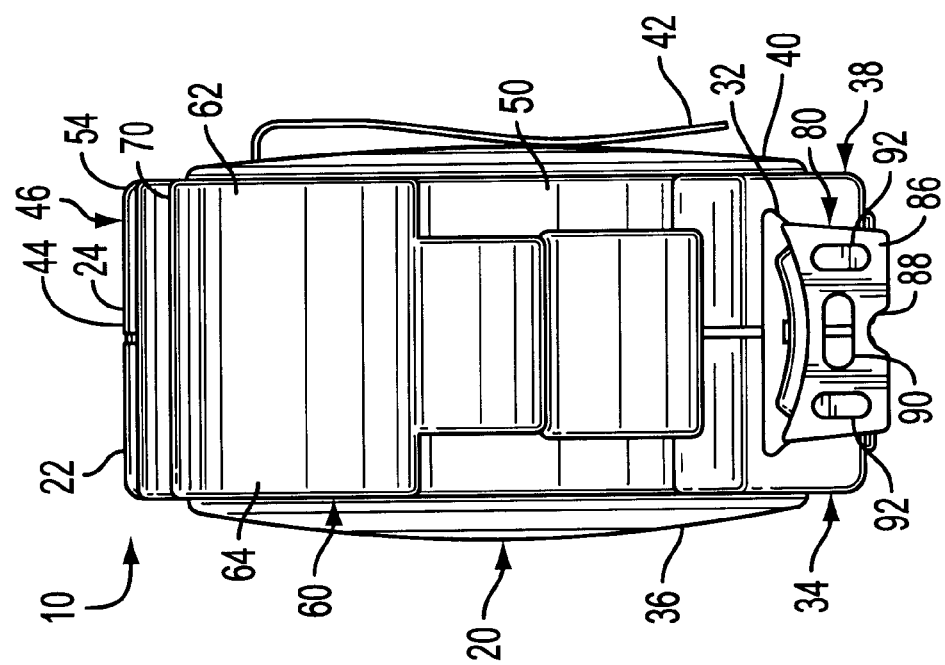

TAPE MEASURE

FIELD OF THE INVENTION

The present invention relates to tape measures, and in particular, to a tape measure having various ergonomic features and a friction member for a clip on an end of a tape rule.

BACKGROUND OF THE INVENTION

Conventional tape measures include a housing that encloses a retractable coiled tape rule. The tape measure is typically constructed to allow a user to extend the tape rule to a specific length corresponding to the length of an object being measured, either lock the tape rule using a locking button or leave the tape rule unlocked, read length of the object on the tape rule, and release the tape rule thereby allowing the tape rule to be retracted within the housing. Tape measures are commonly used at construction sites by professional carpenters and other construction site workers, and therefore tape measure manufacturers typically build tape measures with this type of working environment in mind. Consequently, tape measures are typically constructed with basic and sturdy features that allow the tape measure to withstand heavy, repetitious use. For example, tape measures are typically constructed with rigid plastic housings that are intended to withstand the shock of being dropped, and a relatively small locking button positioned in a recessed portion of the housing to prevent damage to the button if the tape measure is dropped.

In the past manufacturers have overlooked the benefits of constructing a tape measure having features that are ergonomically efficient. By producing a tape measure that is easy to grasp and easy to use, the manufacturer can produce a product that professional carpenters would be interested in using to reduce fatigue in their hands during repeated use of various tools during the workday. In addition, nonprofessionals, such as elderly people or even the average do-it-yourselfer, would be interested in an ergonomically efficient tape measure since the tape measure would be generally easier to control and use.

Various improvements on the tape measure construction can be made to reduce ergonomic inefficiencies of the conventional tape measure. For example, the rigid plastic housing used on conventional tape measures is uncomfortable to grasp in that it is rigid, and provides a smooth, potentially slippery, surface on which to hold the tape measure. Additionally, the locking button on a conventional tape measure tends to be small and difficult to reach unless the user's hand is positioned in an ideal position where the user's thumb is in proper alignment with the locking button.

Other features on a tape measure can improve the usefulness of the tape measure. For example, tape measures are conventionally constructed with a tape clip on an end of the tape rule. The tape clip allows the user to hook the tape clip on an edge of an object to use that object as a means for holding the end of the tape rule in position during measurement if the user does not have an assistant to hold the end of the tape. One problem with such a feature is that the tape clip has a tendency to slip off the edge of the object during measurement. One solution to this problem has been to add a friction surface to a surface on the tape clip that contacts the edge of the object (for example, see U.S. Pat. No. 5,077,911 and U.S. Pat. No, 5,210,956). However, these attempts to solve this problem have been insufficient in that the friction surfaces used were abrasive, which can damage the edge of the object being used to hold the end of the tape rule. Additionally, the friction surfaces are adhered to the surface of the tape clip, which provides a friction surface that can wear or peal off the tape clip, thereby rendering the friction surface ineffective.

Consequently, a need exists for an improved tape measure having ergonomic benefits and an improved clip on an end of the tape rule.

SUMMARY OF THE INVENTION

The present invention provides an improved tape measure having ergonomic benefits and an improved clip on an end of the tape rule. The present invention achieves these results by providing a tape measure housing and locking button having various ergonomic advantages, for example, having outer coatings of a generally soft, resilient, pliant material. The tape measure further provides a tape clip having a friction member molded thereto that is made of a material that is preferably skid resistant and soft.

The tape measure of the present invention advantageously provides a housing that encloses a coiled tape rule retractably mounted therein. The housing includes front and rear side walls connected to one another by a peripheral wall. A terminal end of the tape rule extends through an opening in the peripheral wall of the housing. The housing is advantageously constructed with an outer coating that extends over nearly all of the housing. The outer coating is made of a generally soft, resilient, pliant material, for example an elastomeric material (such as Santoprene®), rubber, or other similarly pliant material, that is overmolded onto the housing. The material used for the outer coating is also preferably a material that is skid resistant, which will not easily slip in the hand of a user. The outer coating is ergonomically efficient in that it gives the user of the tape measure a relatively soft, comfortable grip that will not easily slip out of their hands.

The tape measure of the present invention further advantageously provides a locking button that is slidably attached to the housing and is adapted to selectively prevent the tape rule from moving with respect to the opening in the housing. The locking button generally includes a central portion that is located adjacent to the peripheral wall and at least one side portion located adjacent to a side wall of the housing. The locking button has an outer surface with an outer coating thereon. The locking button of the present invention provides several ergonomic advantages, for example, the width of the locking button and inclusion of at least one side portion that is positioned adjacent a side wall of the housing enables a user to easily reach and engage the locking button with a thumb from any angle. Additionally, the locking button includes an outer coating that is ergonomically efficient in that it provides the user of the tape measure with a relatively soft, skid-resistant surface for engaging the locking button.

The tape measure of the present invention further advantageously provides a tape clip attached to a terminal end of the tape rule that includes a friction member attached to a clip portion of the tape clip. The friction member is made of a generally soft, non-skid material, for example an elastomeric material (such as Santoprene®), rubber, or other similarly non-skid material. The friction member is advantageously mounted to the clip portion by molding the friction member within a pair of apertures through the clip portion. The skid resistant material of the friction member prevents the tape clip from slipping off an edge of an object used to hold the tape clip during measurement and the soft nature of the material prevents any harm to a surface of the object. The construction of the tape clip and the friction member and the molding method used to mount the friction member to the clip portion is cost efficient and effective in fixing the. friction member rigidly to the clip portion.

Additional advantages and other features of the invention will be set forth in part in the description which follows and in part will become apparent to those having ordinary skill in the art upon examination of the following or may be learned from the practice of the invention. The advantages of the invention may be realized and obtained as particularly pointed out in the appended claims.

BRIEF DESCRIPTION OF THE DRAWINGS

FIG. 3 is a front view of the exemplary embodiment of a tape measure according to the present invention.

FIG. 4 is a rear view of the exemplary embodiment of a tape measure according to the present invention.

FIG. 5 is a right side view of the exemplary embodiment of a tape measure according to the present invention.

FIG. 6 is a right side view of the exemplary embodiment of a tape measure according to the present invention.

DETAILED DESCRIPTION OF THE INVENTION

Figure 1:
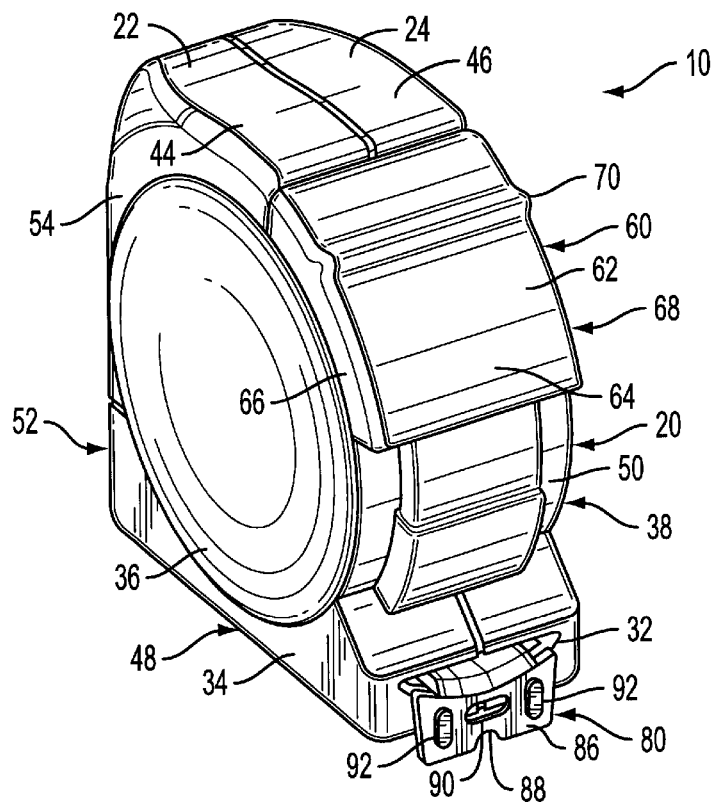
FIG. 1 is a front perspective view of an exemplary embodiment of a tape measure according to the present invention.
Figure 2:
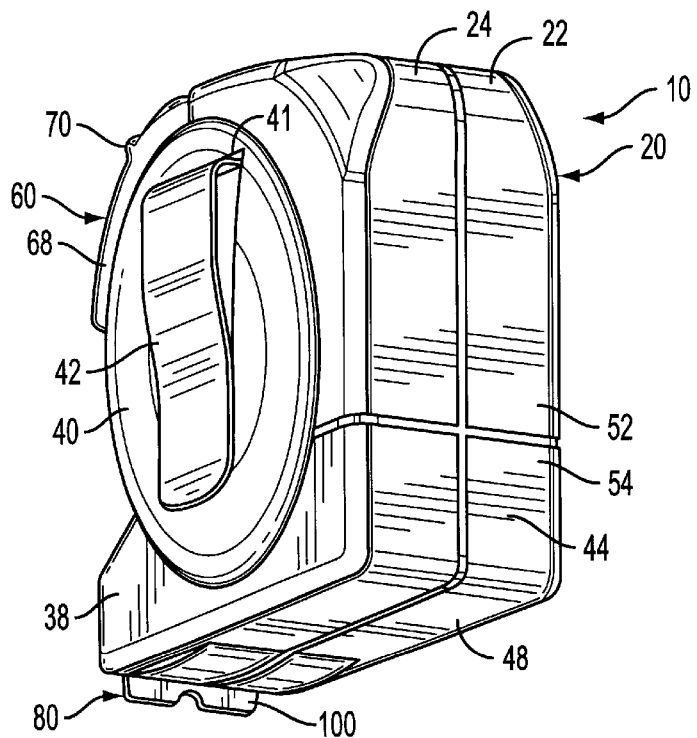
FIG. 2 is a rear perspective view of the exemplary embodiment of a tape measure according to the present invention.
Figure 7:
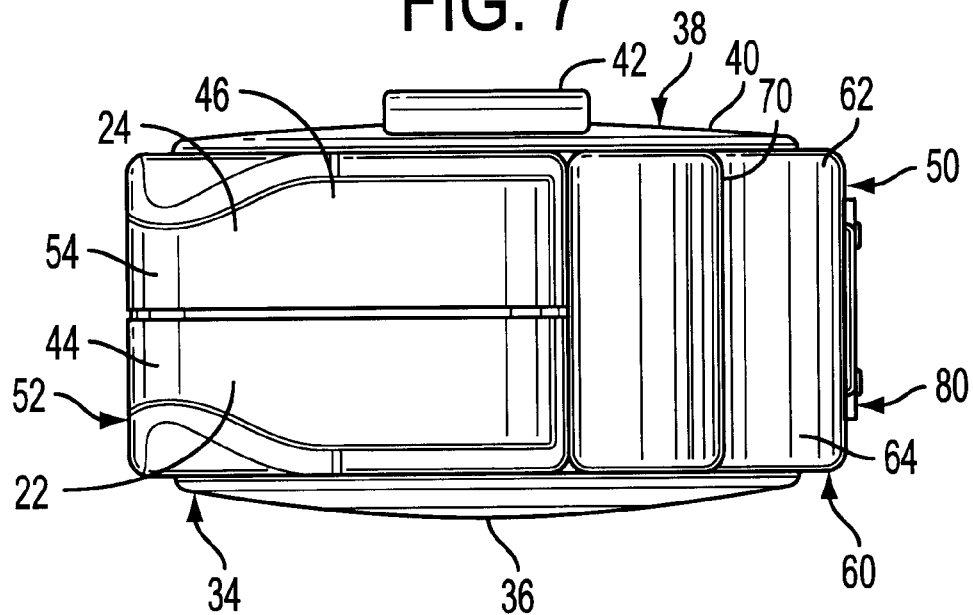
FIG. 7 is a top view of the exemplary embodiment of a tape measure according to the present invention.
Figure 8:
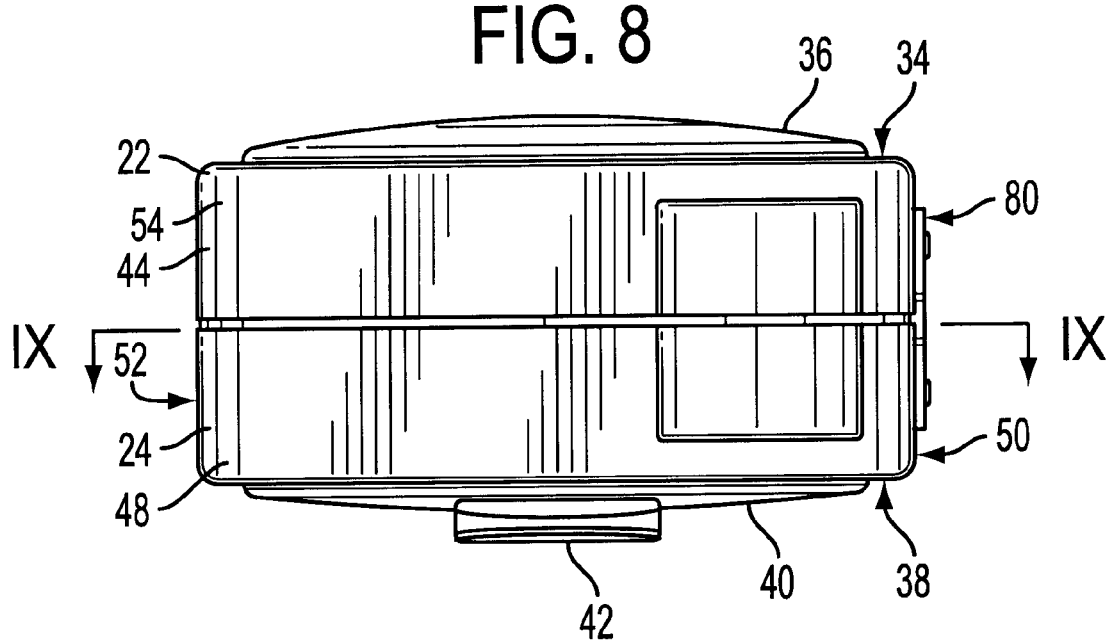
FIG. 8 is a bottom view of the exemplary embodiment of a tape measure according to the present invention.
Figure 9:
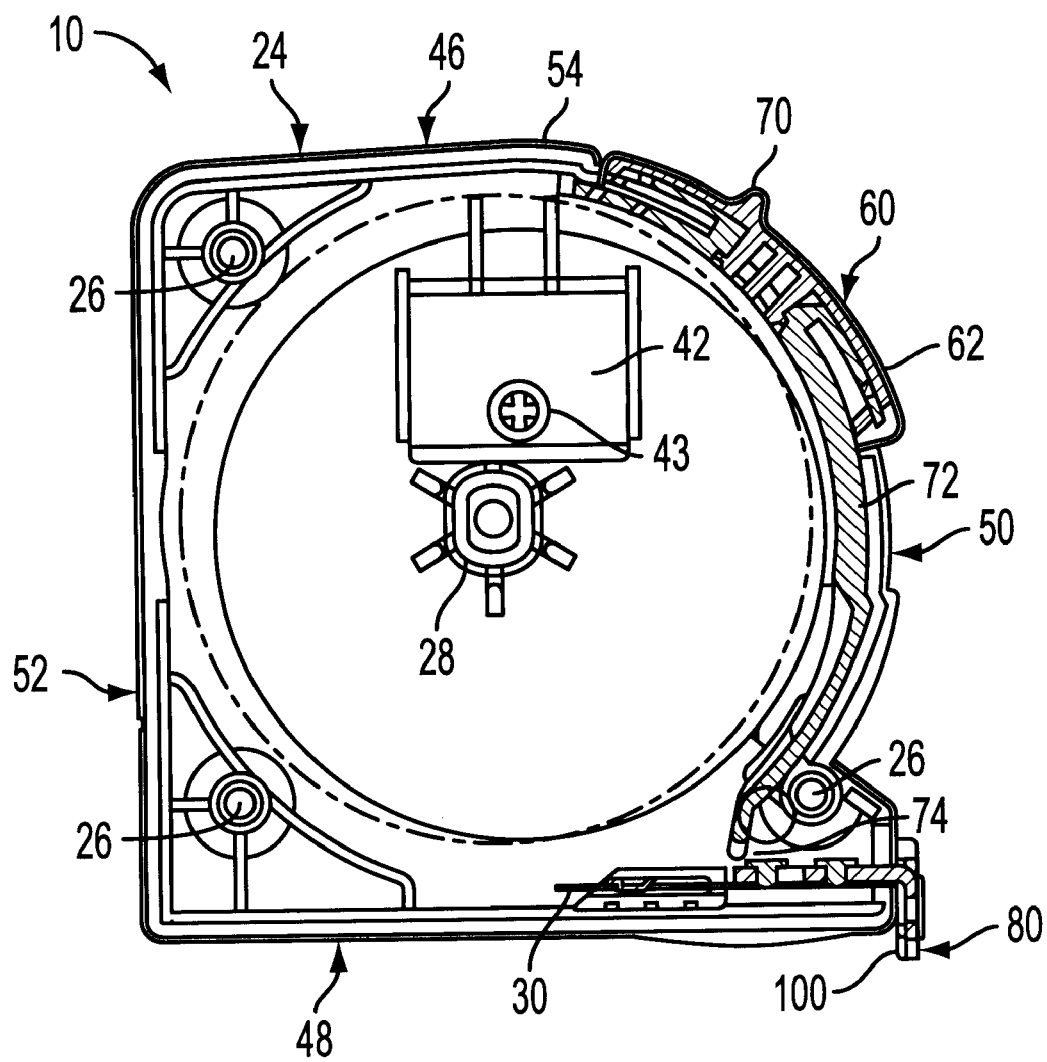
FIG. 9 is a cross-sectional view of the tape measure, taken along line IX—IX in FIG. 8.
Figure 10:
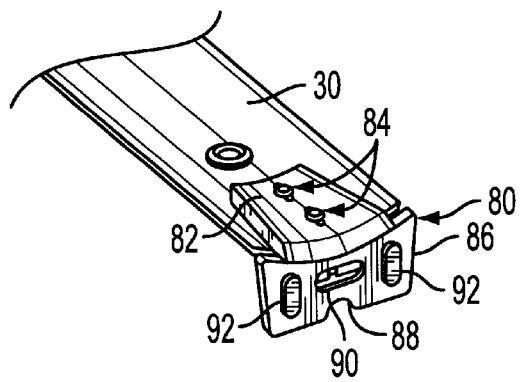
FIG. 10 is a top, front perspective view of an exemplary embodiment of a tape and tape clip according to the present invention.
Figure 11:
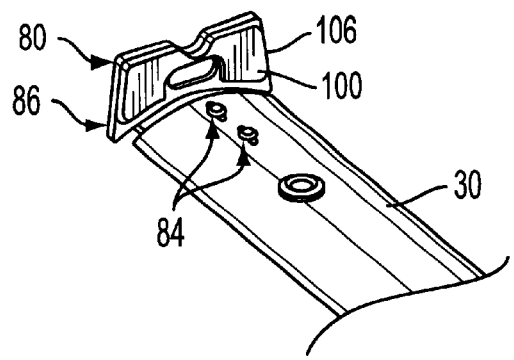
FIG. 11 is a bottom, rear perspective view of an exemplary embodiment of a tape and tape clip according to the present invention.
Figure 12A:
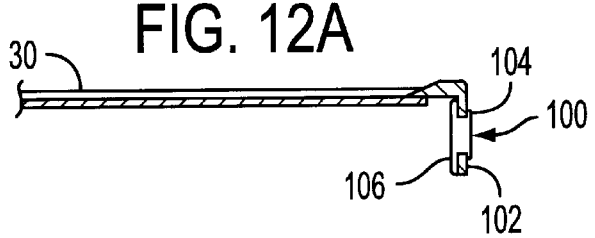
FIG. 12A is a cross-sectional view of an exemplary embodiment of a tape and tape clip taken along an aperture in the tape clip.
Figure 12B:
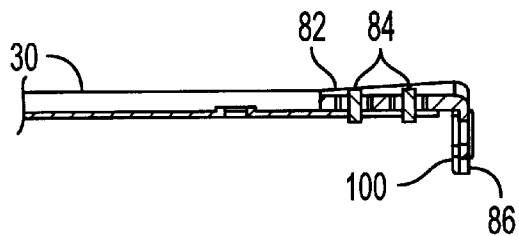
FIG. 12B is a cross-sectional view of an exemplary embodiment of a tape and tape clip taken along a rivet in the tape clip.

An exemplary embodiment of a tape measure 10 according to the present invention is depicted in FIGS. 1–11, 12A, and 12B. The tape measure 10 generally includes a housing 20 that includes a front housing portion 22 and a rear housing portion 24. FIG. 9 depicts the interior of the rear housing portion 24. Referring to FIG. 9, the front housing portion 22 and the rear housing portion 24 are connected to one another in a conventional manner by a series of threaded screws (not depicted) that extend through the front housing portion 22 and into threaded holes 26 in the rear housing portion 24. The interior of the housing 20 houses a tape rule 30 that is coiled within the housing 20 about an axle 28 located in the center of the housing 20. The coiled tape rule 30 is retractably mounted within the housing 20 in a conventional manner. The housing includes a conventional spring mechanism (not depicted) that biases the coiled tape rule 30 about the axle 28 in a clockwise direction as viewed in FIG. 9. The tape rule 30 extends through an opening 32 in the housing 20.

The housing 20 includes a front side wall 34 and a rear side wall 38 connected to one another by a peripheral wall 44. The exemplary embodiment of the tape measure 10 has a rounded edge along the junction between the peripheral wall 44 and the front side wall 34 and along the junction between the peripheral wall 44 and the rear side wall 38. The peripheral wall 44 includes a top portion 46, a bottom portion 48, a front portion 50, and a rear portion 52. The opening 32 in the housing 20 through which the tape rule 30 extends is located on the front portion 50 of the peripheral wall 44, near the junction between the front portion 50 and the bottom portion 48. The front side wall 34 includes a convex portion 36 that outwardly extends from the housing 20. Similarly, the rear side wall 38 includes a convex portion 40 that outwardly extends from the housing 20. The rear side wall 38 further includes a belt clip 42 that is preferably made of a thin, flexible piece of metal. The belt clip 42 extends through a slot 41 in the rear side wall 38 and is fixed to the interior of the rear housing portion 24 by a screw 43 or other fixing device. The housing 20 of the present invention is constructed to eliminate unnecessary dead-air space, thereby reducing the overall size of the housing 20 and facilitating its ergonomic benefits by making it able to be used more comfortably with more control by a wider range of users.

The housing 20 is constructed with an outer coating 54 that extends over nearly all of the housing 20. The outer coating 54 of the exemplary embodiment extends over the front side wall 34, the rear side wall 38, and portions of the peripheral wall 44. The portions that are preferably not covered by the outer coating 54 include portions of the top portion 46 and the front portion 50 of the peripheral wall 44 that are beneath or in the operative path of the locking button 60. The outer coating 54 is made of a generally soft, resilient, pliant material, for example an elastomeric material (such as Santoprene®), rubber, or other similarly pliant material, that is overmolded onto the housing 20. The material used for the outer coating 54 is also preferably a material that is skid resistant, which will not easily slip in the hand of a user. The outer coating 54 of the exemplary embodiment has a hardness grade in a range between about 45 to about 80 Shore A, with a preferred hardness grade of about 70 Shore A. The outer coating 54 is ergonomically efficient in that it gives the user of the tape measure 10 a relatively soft, comfortable grip that will not easily slip out of their hands. The present invention advantageously provides an outer coating 54 that extends over the front side wall 34, the rear side wall 38, and portions of the peripheral wall 44 because a user tends to touch all of these walls when gripping and using the tape measure 10.

The exemplary embodiment of the tape measure 10 includes a locking button 60 that is slidably attached to the housing 20 and is adapted to selectively prevent the tape rule 30 from moving with respect to the opening 32 in the housing 20. The locking button 60 is operable between a locked position and an unlocked position. The locking button 60 of the present invention is oversized as compared to locking buttons of conventional tape measures, thereby facilitating its ease of use at any angle. The exemplary embodiment of the locking button 60 includes a central portion 64 that is located adjacent to the peripheral wall 44, a first side portion 66 located adjacent the front side wall 34, and a second side portion 68 located adjacent the rear side wall 38. The first side portion 66 is substantially coplanar with the front side wall 34 and the second side portion 68 is substantially coplanar with the rear side wall 38. The locking button 60 preferably has a width that extends over the entire peripheral wall 44 from the front side wall 34 to the rear side wall 38. The locking button 60 also preferably includes a ridge 70 that extends over the central portion 64.

Referring to FIG. 9, the exemplary embodiment of the locking button 60 is attached to a mounting member 72 that is slidably connected to the housing 20. The mounting member 72 has a terminal end 74. When the locking button 60 is in the unlocked position, as depicted in FIG. 9, the terminal end 74 of the mounting member 72 is adjacent the tape rule 30. When the locking button 60 is slide to the locked position (not depicted), the mounting member 72 slides in the housing 20 such that the terminal end 74 contacts the tape rule 30 at a position near the opening 32 in the housing 20. In the locked position the terminal end 74 of the mounting member 72 presses the tape rule 30 against an inner surface of the housing 20 such that the tape rule 30 is unable to move with respect to the opening 32.

The locking button 60 has an outer surface with an outer coating 62 thereon. The outer coating 62 is made of a generally soft, resilient, pliant material, for example an elastomeric material (such as Santoprene®), rubber, or other similarly pliant material, that is overmolded onto the locking button 60. The material used for the outer coating 62 is also preferably a material that is skid resistant, which will not easily slip in the hand of a user. The outer coating 62 of the exemplary embodiment has a hardness grade in a range between about 45 to about 80 Shore A, with a preferred hardness grade of about 70 Shore A.

The locking button 60 of the present invention is ergonomically efficient. The width of the locking button 60 and inclusion of side portions 66 and 68 that are positioned adjacent the front and rear side walls 34 and 38, respectively, enable a user to easily reach and engage the locking button 60 with a thumb from any angle. For example, the side portions 66 and 68 allow the user to engage the locking button 60 from the side. The outer coating 62 is ergonomically efficient in that it provides the user of the tape measure 10 with a relatively soft, skid-resistant surface for engaging the locking button 60.

The tape measure 10 further includes a tape clip 80 attached to a terminal end of the tape rule 30. The tape clip 80 includes a mounting portion 82 and a clip portion 86. The mounting portion 82 is mounted to the tape rule 30 by a pair of rivets 84. The clip portion 86 includes a recessed portion 88 on a bottom edge thereof that can be used to rest on a shaft of a nail so that the nail can be used to hold the tape clip 80 in a fixed position during measurement. The clip portion 86 further includes a slot 90. The slot 90 can be used to hold the tape clip 80 in a fixed position during measurement by placing a nail through the slot and fixing the nail to an object.

A third manner of fixing the tape clip 80 a position during measurement is to hook the clip portion 86 of the tape clip 80 over an edge of an object. The tape clip 80 of the present invention advantageously includes a friction member 100 that is attached to the clip portion 86. The friction member 100 is made of a generally soft, skid resistant material, for example an elastomeric material (such as Santoprene®), rubber, or other similarly non-skid material. The friction member 100 of the exemplary embodiment has a hardness grade in a range between about 45 to about 80 Shore A, with a preferred hardness grade of about 70 Shore A. The friction member 100 is advantageously mounted to the clip portion 86 by molding the friction member 100 within a pair of apertures 92 through the clip portion 86. The friction member 100 is molded within the apertures 92 such that the friction member 100 includes a portion 102 that extends through the apertures 92 and a wide portion 104 that extends over the edge of the apertures 92 to ensure that the friction member 100 is prevented from slipping out of the apertures 92. The friction member 100 further includes a contact portion 106 that is positioned on the opposite side of the clip portion 86 than the wide portion 104. Note that both the wide portion 104 and the contact portion 106 have cross-sectional areas that are greater than a cross-sectional area of their respective apertures 92. The contact portion 106 of the exemplary embodiment covers a substantial portion of the side of the clip portion 86. In order to use the tape clip 80, the clip portion 86 is hooked over the edge of an object such that the contact portion 106 is in contact with a surface on the object. The material used for the friction member 100 is preferably skid resistant and therefore prevents the contact portion 106 from slipping off the edge of the object during measurement and is preferably soft and therefore prevents any harm to a surface of an object used to hold the tape clip 80 during measurement. The construction of the tape clip 80 and the friction member 100 and the molding method used to mount the friction member 100 to the clip portion 86 is cost efficient and effective in fixing the friction member 100 rigidly to the clip portion 86.

The present invention advantageously provides an improved tape measure 10 having ergonomic benefits and an improved tape clip 80 on an end of the tape rule 30. The present invention achieves these results by providing a tape measure housing 20 and locking button 60 having various ergonomic advantages, for example, having outer coatings, 54 and 62, of a generally soft, resilient, pliant material. The tape measure 10 further advantageously provides a tape clip 80 having a friction member 100 molded thereto that is made of a material that is preferably skid resistant and soft.

The tape measure 10 depicted in FIGS. 1–11, 12A, and 12B provides an aesthetically pleasing product. The ornamental features of the tape measure depicted in FIGS. 1–11, 12A, and 12B are contemplated as being a part of the invention disclosed herein.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the present invention.

Only the preferred embodiment of the invention and an example of its versatility are shown and described in the present disclosure. It is to be understood that the invention is capable of use in various other combinations and environments and is capable of changes or modifications within the scope of the inventive concept as expressed herein.

What is claimed is:

1. A tape measure comprising:
   a housing further comprising two side walls and a peripheral wall connecting said side walls, said peripheral wall having an opening, and said housing having a pliant coating on an outer surface thereof;
   a coiled extendable tape rule retractably mounted within said housing and extending through said opening; and
   a locking button slidably attached to said housing, said locking button being adapted to selectively prevent said tape rule from moving with respect to said opening in said housing, said locking button including a central portion adjacent to said peripheral wall of said housing and at least one side portion being substantially coplanar with a portion of one of said side walls of said housing.

2. The tape measure according to claim 1, wherein said pliant coating is made of an elastomeric material.

3. The tape measure according to claim 1, wherein said pliant coating is made of a rubber material.

4. The tape measure according to claim 1, wherein said pliant coating has a hardness grade in a range between about 45 to about 80 Shore A.

5. The tape measure according to claim 4, wherein said pliant coating has a hardness grade of about 70 Shore A.

6. The tape measure according to claim 1, wherein said pliant coating covers substantially all of said outer surface of said housing.

7. The tape measure according to claim 1, wherein said housing has a convex side surface.

8. The tape measure according to claim 1, wherein said locking button is coated with an elastomeric material.

9. The tape measure according to claim 1, wherein said locking button is coated with a rubber material.

10. The tape measure according to claim 1, wherein said tape rule has a tape clip attached to a terminal end thereof, said tape clip having a clip portion extending downwardly from said tape rule, said clip portion having an aperture with a friction member affixed therein, said friction member having a contact portion on a first side of said clip portion.

11. The tape measure according to claim 10, wherein said friction member is made of an elastomeric material.

12. The tape measure according to claim 10, wherein said friction member is made of an rubber material.

13. The tape measure according to claim 10, wherein said friction member comprises a first portion that extends through said aperture, said contact portion being connected to said first portion, said contact portion having a cross-sectional area greater than the cross-sectional area of said aperture, and a wide portion connected to said first portion and positioned on a second side of said clip portion, said wide portion having a cross-sectional area greater than a cross-sectional area of said aperture.

14. A tape measure comprising:

a housing having two side walls and a peripheral wall connecting said side walls, said housing having an opening on said peripheral wall;

a coiled extendable tape rule retractably mounted within said housing and extending through said opening; and a locking button slidably attached to said housing, said locking button having a pliant coating on an outer surface thereof, said locking button being adapted to selectively prevent said tape rule from moving with respect to said opening in said housing, said locking button including a central portion located adjacent to said peripheral wall of said housing and at least one side portion being substantially coplanar with a portion of one of said side walls of said housing.

15. The tape measure according to claim 14, wherein said locking button includes a second side portion being substantially coplanar with a portion of another of said side walls of said housing.

16. The tape measure according to claim 14, wherein said pliant coating is an elastomeric material.

17. The tape measure according to claim 14, wherein said pliant coating is a rubber material.

18. A tape measure comprising:

a housing having an opening; and a coiled extendable tape rule retractably mounted within said housing and extending through said opening, said tape rule having a tape clip attached to a terminal end thereof, said tape clip having a clip portion extending downwardly from said tape rule, said clip portion having an aperture with a friction member affixed therein, said friction member having a contact portion on a first side of said clip portion.

19. The tape measure according to claim 18, wherein said friction member is made of an elastomeric material.

20. The tape measure according to claim 18, wherein said friction member is made of an rubber material.

21. The tape measure according to claim 18, wherein said friction member comprises a first portion that extends through said aperture, said contact portion being connected to said first portion, said contact portion having a cross-sectional area greater than the cross-sectional area of said aperture, and a wide portion connected to said first portion and positioned on a second side of said clip portion, said wide portion having a cross-sectional area greater than a cross-sectional area of said aperture.

* * * * *